United States Patent
Circenis

(10) Patent No.: US 7,047,533 B2
(45) Date of Patent: May 16, 2006

(54) WAIT UTILITY AND METHOD

(75) Inventor: Edgar Circenis, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 839 days.

(21) Appl. No.: 09/948,780

(22) Filed: Sep. 10, 2001

(65) Prior Publication Data

US 2003/0051062 A1    Mar. 13, 2003

(51) Int. Cl.
*G06F 3/00* (2006.01)
*G06F 9/46* (2006.01)

(52) U.S. Cl. ...................... 719/318; 718/100

(58) Field of Classification Search ........ 718/100–108; 709/200–253; 719/318

See application file for complete search history.

(56) References Cited

U.S. PATENT DOCUMENTS

| | | | |
|---|---|---|---|
| 5,423,039 A * | 6/1995 | Matteson ...................... | 718/107 |
| 5,940,771 A * | 8/1999 | Gollnick et al. ............. | 455/517 |
| 6,353,845 B1 * | 3/2002 | Torzewski et al. .......... | 718/102 |
| 6,408,272 B1 * | 6/2002 | White et al. ................ | 704/270.1 |

* cited by examiner

*Primary Examiner*—Meng-Al T. An
*Assistant Examiner*—Kenneth Tang

(57) ABSTRACT

A generic wait utility apparatus, and corresponding method, may be used with one or more application programs to provide flexible waiting functions. Because the wait utility is generic, the wait utility may be used with different application programs, and need not be custom designed for a specific application program or operation of a particular application program. The wait utility may be used with an application program to provide improved processing status information displays and options related to the processing. The wait utility integrates previous wait utility solutions into one generic, multi-purpose wait utility program that is capable of providing a general purposes refreshable status display.

18 Claims, 11 Drawing Sheets

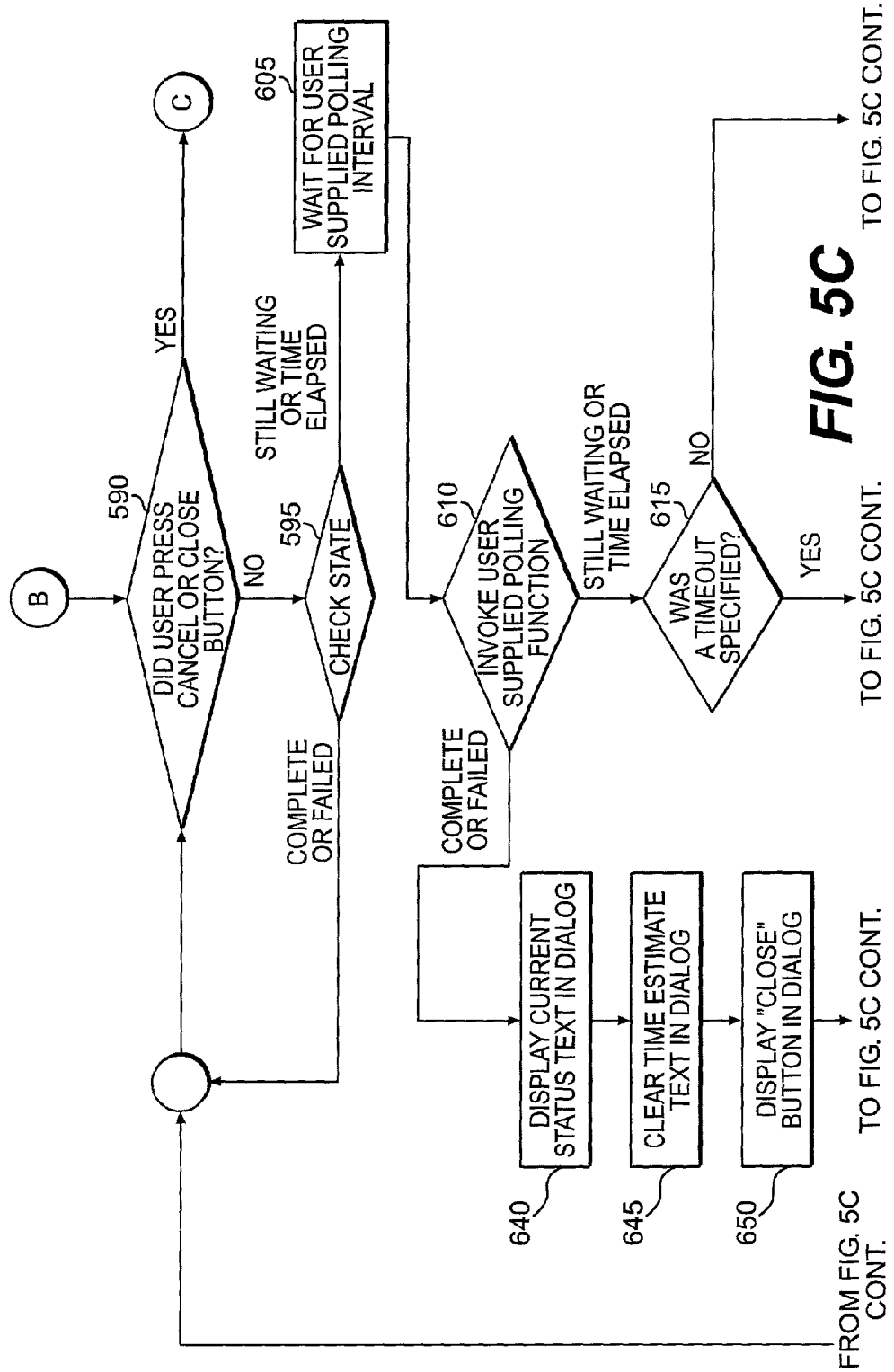

WAIT UTILITY AND METHOD

TECHNICAL FIELD

The technical field is processing devices and methods that are used to track execution of events.

BACKGROUND

In computer systems, communications systems, and similar systems, a user may invoke an task and then be required to wait while the task is processed. The user typically has little or no control over the task during this processing or wait time. Further, the user often has little information as to the status of completing the task. A typical example is an attempted connection to an Internet web site. Such connection may take a long time, and ultimately may not be successful. The only status the user may receive is a spinning globe icon. If the user elects to halt processing of the task (e.g., halt the attempt to connect to the Internet web site), the user may not be aware of the affect such an action might have on other processes and tasks. Other examples include copying or printing files. A bar graph may indicate approximate completion of a copy request, and a printer icon with numbered pages might indicate the number of pages sent to a printer buffer. Other application programs may present a hourglass icon to indicate that some processing task is occurring. Such application programs generally inhibit any user interaction with the application program during the time the hourglass icon is present. Furthermore, these application programs usually do not provide any additional status information, such as time remaining for the task, and similar task status information. A utility program that does provide task status information may lack several desirable features. For example, the utility program may not indicate the effect of closing or stopping the task, may not provide for interaction with the user, and may not have a time out feature.

SUMMARY

A generic wait utility apparatus, and corresponding method, may be used with one or more application programs to provide flexible waiting functions. The wait utility may be a standalone program, or may be incorporated into one or more of the application programs. Because the wait utility is generic, the wait utility may be used with different application programs, and need not be custom designed for a specific application program or an operation of a particular application program.

The wait utility may be used with an application program to provide improved processing status information displays and options related to the processing. The wait utility integrates previous wait utility solutions into one generic, multi-purpose wait utility program that is capable of providing a general purpose, refreshable status display. The wait utility accommodates forced (required or mandatory) and optional waiting, and allows the user to cancel both mandatory and optional waits. The wait utility provides interactive and non-interactive waiting, and allows the user to cancel waiting for events that will never occur. The wait utility incorporates both internal-to-code waiting and user-visible waiting. The wait utility also eliminates the need for the user to interact with a dialog if the wait is short.

The wait utility may be used in conjunction with an application program that requires waiting for completion of some application operations, and that may allow waiting for other application operations. That is, the application program may provide for mandatory and non-mandatory waiting. For example, an application program may allow a waiting function upon boot up of the application program to wait until completion of the boot up even though reaching boot up is not necessary before the application program can continue. Mandatory waiting may be invoked for other application operations, such as waiting for completion of a hardware self-test by the application program.

The wait utility allows the user to specify a number of wait parameters, including a polling function and an associated polling interval and argument. The wait utility applies the argument to the polling function and the polling function to the application program in order to determine a status of the application program operation. The polling function may take an initial text string as an input and returns the operating status, based on application of the argument. The polling interval may be used to specify how frequently the polling function is to be applied. The wait utility also allows the user to specify a time estimate (timeout) beyond which the wait utility may safely assume that the application operation has failed. Finally, the wait utility allows the user to designate flags to indicate: whether the wait must complete (mandatory) or is merely for the user's convenience, whether the wait is interactive or non-interactive, and whether or not an unsuccessful wait should be followed by an interactive wait.

In an embodiment of the method, a task, or application program operation, is controlled by calling a wait utility to invoke a wait; determining if the wait is one of interactive and non-interactive; if the wait is non-interactive, invoking user-defined wait parameters, and determining an end state of the event based on the wait parameters; and if the wait is interactive, determining if the wait is mandatory, determining if a timeout has expired, and invoking user-defined wait parameters. The method further comprises, if the wait is non-interactive, determining if a timeout has expired, and if the timeout has not expired, the method further comprises entering a sleep cycle corresponding to a user-defined wait parameter, wherein the user defined wait parameter comprises a polling interval; and if the timeout has expired, the method further comprises determining if the wait is interactive and non-interactive, and wherein if the wait is non-interactive, the end state of the event cannot be reached. According to an aspect of this embodiment, the user-defined wait parameters comprise one or more of a polling function, an argument to be passed to the polling function, initial text to be displayed in an interactive dialog, a time estimate for the wait, whether the wait is mandatory, and whether the wait is interactive, non-interactive, or interactive after the timeout, and the step of invoking the user-defined wait parameters comprises applying the argument to the polling function to determine the event status, wherein the event status includes one or more of time remaining for the task, timeout expired, end state reached for the task, and end state cannot be reached for the task. According to another aspect of the embodiment, the method further comprises receiving an instruction to terminate the wait.

In an embodiment, the wait utility, which may be used in conjunction with one or more applications, includes a user interface module that receives user-defined wait parameters, a polling engine that applies one or more of the user-defined wait parameters to an event of an application, a text/graphics builder that provides an event status dialog for display to a user of the application, an interactive module that receives an instruction from the user and provides a prompt to the user, and a timeout manager that determines when a timeout condition related to the event is reached. In an aspect of the embodiment of the wait utility, the polling engine applies an argument to a polling function to determine a status of the event. In a further aspect of the wait utility, the polling engine applies the argument to the polling function at the polling interval. In yet another aspect of the wait utility, the interactive module prompts the user to close the wait when the task status is one of complete and failed, and prompts the user to cancel the wait when the event is pending.

DESCRIPTION OF THE DRAWINGS

The detailed description will refer to the following drawings, wherein like numerals refer to like items, and wherein.

DETAILED DESCRIPTION

In computer systems, communications systems, and similar systems, a user may invoke a task and then be required to wait while the task is processed. The user typically has little or no control over the task during this processing or wait time. Further, the user often has little information as to the status of completing the task. A typical example is an attempted connection to an Internet web site. Such connection may take a long time, and ultimately may not be successful. The only status the user may receive is a spinning globe icon or a moving bar graph. Other status mechanisms include a percentage complete indication, a number of images to download indication, or a hourglass icon. If the user elects to halt processing of the task (e.g., halt the attempt to connect to the Internet web site), the user may not be aware of the affect such an action might have on other processes and tasks. Other application program operations and task examples include copying or printing files. A bar graph may indicate approximate completion of a copy request, and a printer icon with numbered pages might indicate the number of pages sent to a printer buffer. A utility program that provides this task status information may lack several desirable features. For example, the utility program may not indicate the effect of closing or stopping the task, may not provide for interaction with the user, and may not have a time out feature.

Figure 1A:
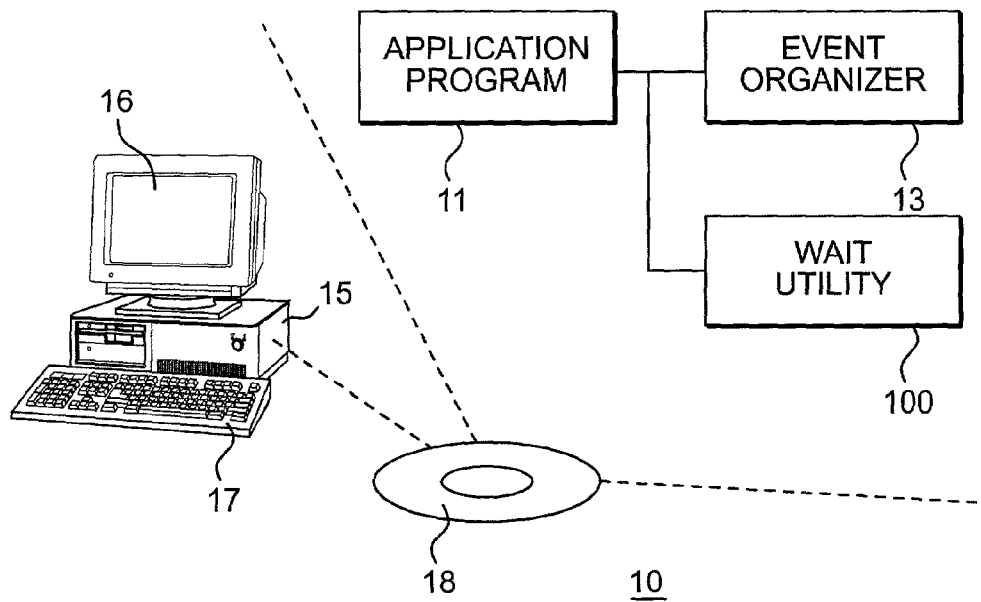
FIGS. 1A and 1B illustrate alternative arrangements of systems incorporating a generic wait utility.

FIG. 1A is a block diagram of a system 10 that incorporates a wait utility program. In FIG. 1A the system 10 comprises an application program 11, an event manager 13, and a wait utility 100. The application program 11, event manager 13 and wait utility 100 may be stored in a computer readable memory, such as a CD-ROM 18, or other optical or magnetic storage device, a ROM, EEPROM or any other computer readable storage media. The application program 11, event manager 13 and wait utility 100 may operate on a general or special purpose computer. In FIG. 1A, the CD-ROM 18 is shown for use in conjunction with a personal computer 15 having a display 16 and an input (keyboard) 17.

Figure 1B:
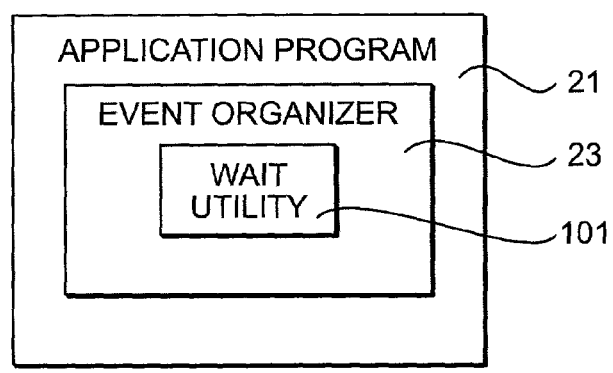

In FIG. 1A, the event manager 13 and the wait utility 100 are shown as separate programs that interface with the application program 11. FIG. 1B is a block diagram of an alternate system 20 that incorporates a wait utility program. The system 20 includes an application program 21. Embedded within the application program 21 is an event manager 23 and a wait utility 101. Other arrangements of application programs, event managers, and wait utilities are also possible.

The system 10 shown in FIG. 1A allows use of a preferred, generic wait utility program, such as the wait utility 100. By making the program generic, the wait utility 100 may be used with different application programs, and need not be custom designed for a specific application program.

The wait utility 100 may be used with an application program to provide improved processing status information displays and options related to the processing. The wait utility integrates previous wait utility solutions into one generic, multi-purpose wait utility program that is capable of providing a general purpose, refreshable status display. Other features of the wait utility 100 are: 1) the ability to handle forced (mandatory) and optional waiting, for example by setting a must_wait flag as appropriate; 2) the ability to cancel both required and optional waits; 3) the ability to handle interactive and non-interactive waiting; 4) the ability to use internal-to-code waiting and user-visible waiting; and 5) the ability to cancel waiting for events that will never occur. Because the wait utility 100 is generic, use of the wait utility 100 eliminates the need to write a custom wait dialog for different waiting scenarios, and to use a different wait utility program for interactive and non-interactive waits. The wait utility also eliminates the need for the user to interact with a dialog if the wait is short. Other advantages of the wait utility include the ability to cancel waiting for all types of waits, the ability to indicate to the user that a wait should be canceled because the wait will never complete, and the ability to cancel waiting for events that do not require waiting.

The wait utility 100 may be used in conjunction with an application program that requires waiting for completion of some application operations, and that may allow waiting for other application operations. That is, the application program may provide for mandatory and non-mandatory waiting. For example, an application program may allow a waiting function for startup or shutdown of another system component to wait until completion of the startup or shutdown even though reaching the end state (startup or shutdown) is not required before the application program can continue. Mandatory waiting may be invoked for other application operations, such as completion of a hardware self-test by the application program.

The wait utility 100 allows the user to specify wait parameters, including a polling function and an associated polling interval and argument. The wait utility 100 applies the argument to the polling function and the polling function to the application program in order to determine a status or state of the application program. The polling function may take an initial text string as an input and may return the status, based on application of the argument. The polling interval may be used to specify how frequently the polling function is to be applied. The wait parameters may also include a time estimate (timeout) beyond which the wait utility 100 may safely assume that the application operation has failed. Finally, the wait parameters may also include flags to indicate: whether the wait must complete (mandatory) or is merely for the user's convenience, whether the wait is interactive or non-interactive, and whether or not an unsuccessful wait should be followed by an interactive wait.

Figure 2:
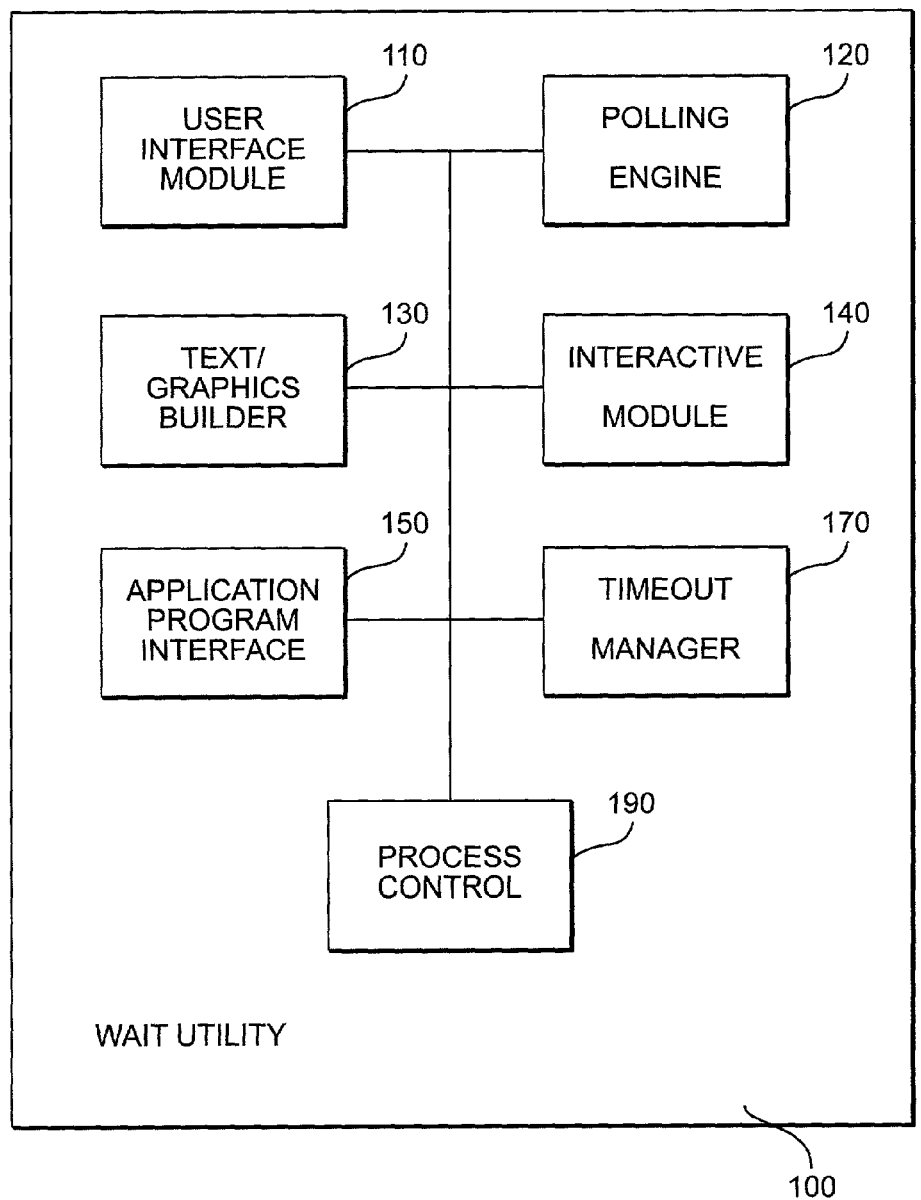
FIG. 2 is a block diagram of the generic wait utility of FIG. 1A.

FIG. 2 is a block diagram of the wait utility 100 that may be used to provide a flexible, general-purpose mechanism to handle waiting for events. The wait utility 100 includes a user interface module 110, a polling engine 120, a text/ graphics generator 130, an interactive module 140, an application program interface 150, a timeout manager 170, and a process control manager 190. The above-listed modules and components of the wait utility 100 may be implemented as program code stored on a general or special purpose computer or processor. Alternatively, the modules and components may be embedded in a computer readable medium, such as a compact disk or other optical storage media; magnetic storage, including portable and fixed magnetic storage media; and any other storage device upon which software code may be written and accessed. The functions of the modules and components may also be incorporated into hardware, or may be embodied in a combination of hardware and software.

The user interface module 110 provides a means for receiving user inputs related to wait operations, and means for returning information to the user based on the user inputs and the wait operations. The user interface module 110 may display various dialog boxes and control features that allow the user to interact with the wait utility 100. These control features may include, for example CLOSE and CANCEL "buttons" that the user can "push" to instruct the wait utility 100 to close or cancel an operation. The user interface module 110 may also allow the user to enter other information related to the waiting operation, including the polling function, the argument to be used with the polling function, initial text to be displayed in an interactive dialog screen or box, time estimate for the monitored application operation, polling interval, and other waiting parameters.

The polling engine 120 provides a means for checking the state or status of the application program operation. The polling engine 120 takes the user's inputs related to the polling function, argument, and the polling interval, and initiates a periodic check of the application program operation to determine the state of the operation. For example, the polling engine 120 checks whether the operation has reached its end state, or if the end state cannot be reached, and passes this information to other components of the wait utility 100.

The text/graphics builder 130 provides a means for constructing dialog boxes, and populating the dialog boxes that are displayed through the user interface module 110. The text/graphics builder 130, in conjunction with the interactive module 140, also generates interactive features, such as CANCEL and CLOSE buttons that allow the user to interact with the wait utility 100.

The interactive module 140 provides means for processing instructions from the user, formulating interactive queries, and controlling other aspects of interactive waiting. For example, the interactive module 140 provides the means to generate soft buttons, such as CANCEL and CLOSE buttons that can be selected to end a current wait.

The application program interface 150 serves as a communications means between the wait utility and the application being monitored by the wait utility 100. The polling engine 120 communicates with the interface 150 to determine the current status of the application program, and to provide that status to other components of the wait utility 100.

The timeout manager 170 provides a means to keep track of runtime for the application operation and determines when a timeout has been reached. If a timeout is reached, the timeout manager 170 signals the occurrence of this event to other components of the wait utility 100.

The process control manager 190 provides overall control means for the wait utility 100.

FIGS. 3A–3G illustrate user interface displays produced by a specific application of the wait utility of FIG. 1A. The specific application relates to a partition of hardware and firmware devices in a computing environment. In the illustrated example, the application operation being monitored is power-up self tests of four cells (0/4, 0/5, 0/6, and 0/7) (where a cell is a computer system component containing processors and memory) in the partition. The power-on self tests must complete satisfactorily before the cells can be added to the partition. Thus, the user is waiting for completion of the self-tests, and the wait is mandatory (a must_wait flag is set). The user has designated the polling function of waiting for power-on self tests to complete; an initial text of "Waiting for cells 0/4, 0/5, 0/6, 0/7 to complete power on self tests."; a timeout of five minutes, a polling interval of five seconds, and an argument for the polling function comprising cells 0/4, 0/5, 0/6 and 0/7.

Figure 3A:
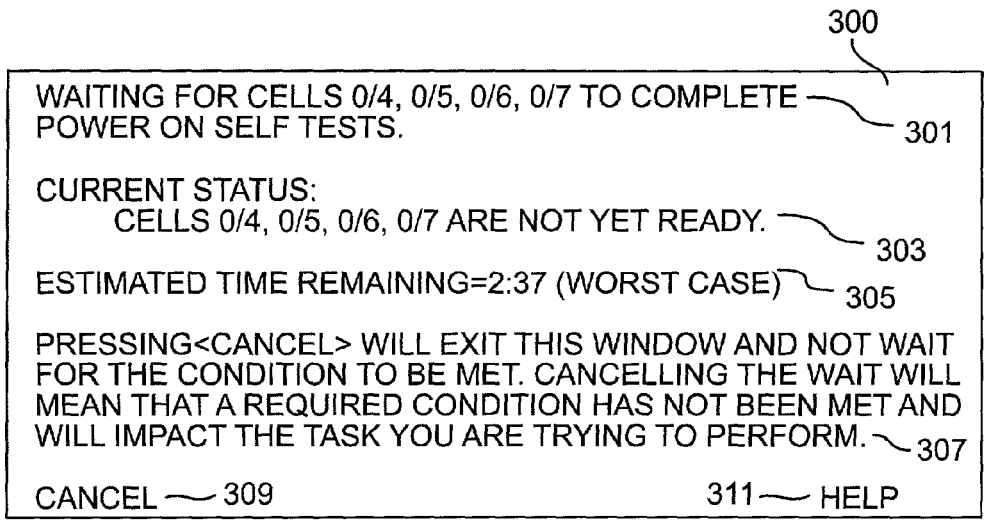
FIGS. 3A–3G illustrate user interface displays for a specific application of the wait utility of FIG. 1A.

FIG. 3A shows an example of an initial display 300 made available to the user after completion of the first polling cycle. The display 300 includes an initial string dialog 301 showing the user-entered text, a current status dialog 303 showing a status of each of the cells, an estimated time dialog 305 showing the time estimate to complete the power on self test, and a return status dialog 307 that states the effect of canceling the application operation. Also shown on the display 300 is an interactive CANCEL button 309 and a HELP button 311. "Pushing" the CANCEL button 309 will initiate a cancel wait instruction to stop the wait, and may have adverse consequences as indicated in the return status dialog 307.

Figure 3B:
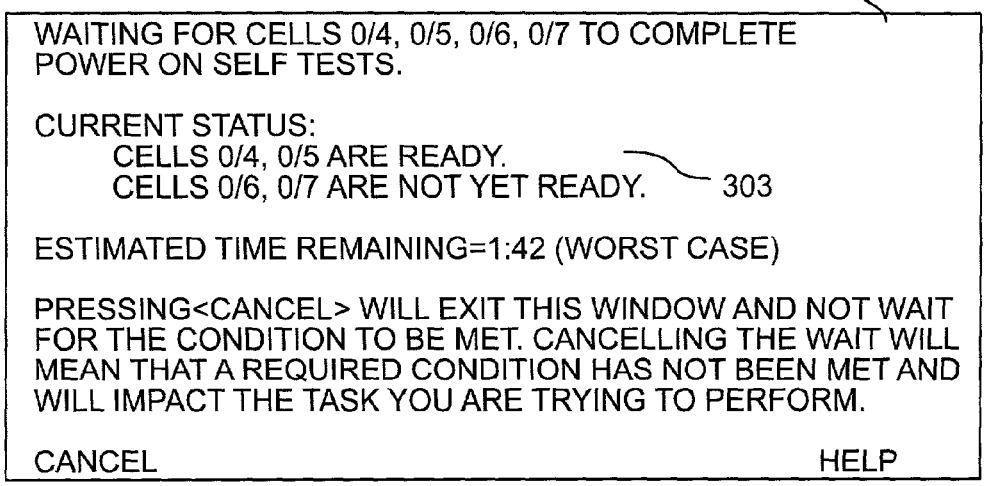

FIG. 3B shows a subsequent display 320 after completion of one or more additional polling intervals. As shown in FIG. 3B, the current status dialog 303 now shows that cells 0/4 and 0/5 have completed the power on self test and that cells 0/6 and 0/7 have not completed the power on self test.

Figure 3C:
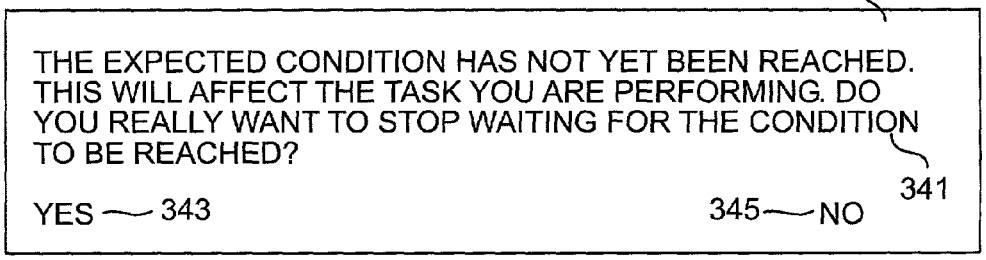

FIG. 3C shows a display 340 that may be provided should the user push the CANCEL button 309. The display includes a warning dialog 341 that the expected condition (power on self test of all cells) has not been reached, and asks the user to confirm the cancel wait instruction. Included on the display 340 are YES button 343 and NO button 345, which the user may push to signify a desire to cancel or not cancel the wait operation.

Figure 3D:
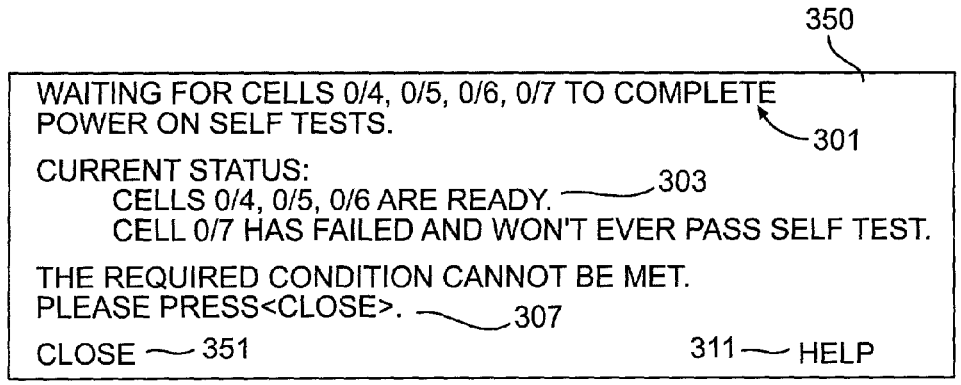

FIG. 3D shows a display 350 after the polling function returns an error condition, in this example, that cell 0/7 has failed. The display includes the dialogs shown in FIG. 3A, along with a CLOSE button 351, which indicates that waiting is over. In FIG. 3D, the current status dialog 303 indicates the condition of the cells, and the return status dialog 307 indicates that the required condition (completion of power on self test for all four cells) cannot be met. The return status dialog 307 also prompts the user to push the CLOSE button 351 to end the wait operation without achieving the desired end state.

Figure 3E:
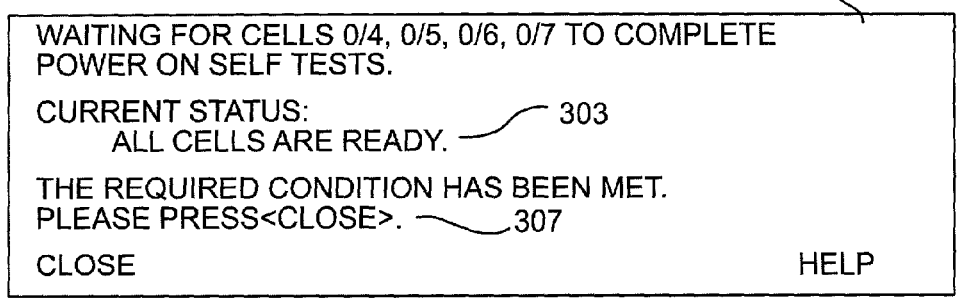

FIG. 3E shows a display 360 after the desired end state (power on self test complete for all four cells) is reached. The current status dialog 303 shows that all cells are ready. The return status dialog 307 states that the required condition is met and prompts the user to press the CLOSE button.

Figure 3F:
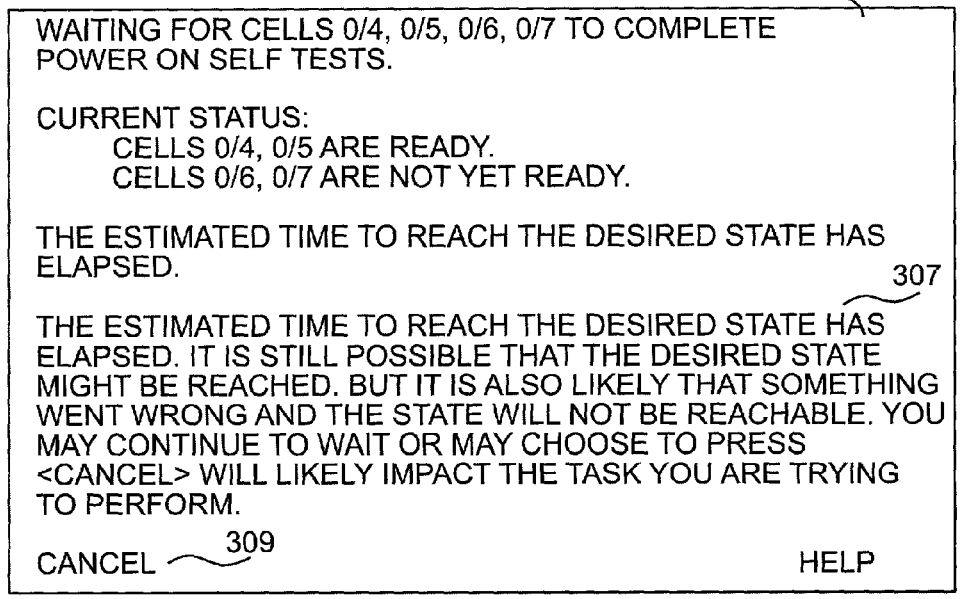

FIG. 3F shows a display 370 when the elapsed time has exceeded the time estimate. The current status dialog indicates that the time has elapsed, and the return status dialog 307 states that a problem may exist that makes achieving the desired end state impossible. The return status dialog 307 prompts the user to continue waiting, or to push the CANCEL button 309 to terminate the wait.

Figure 3G:
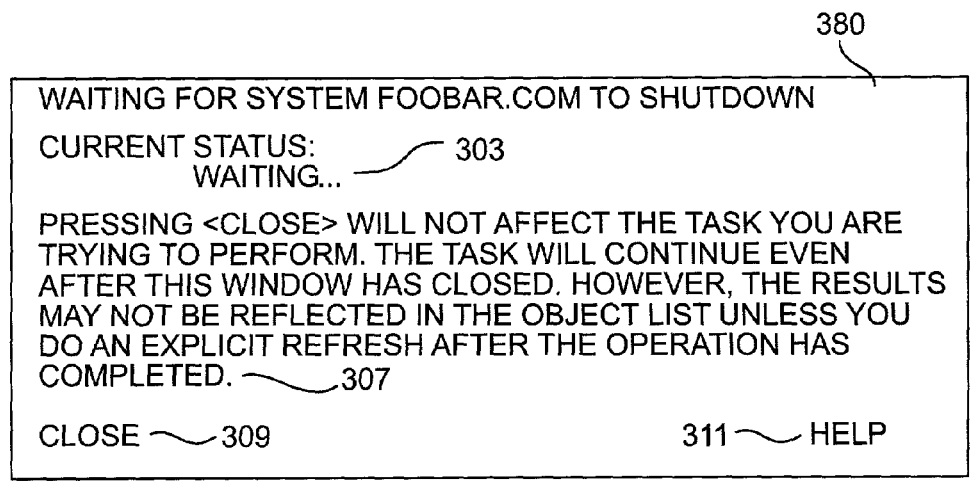

FIG. 3G shows a display 380 assuming a must wait flag had not been set. In FIG. 3G, the display 380 includes the current status dialog 303, the return status dialog 307, and the CLOSE and HELP buttons 309 and 311, respectively. Since the wait is not mandatory, closing the wait utility will not affect the application operation.

Figure 4:
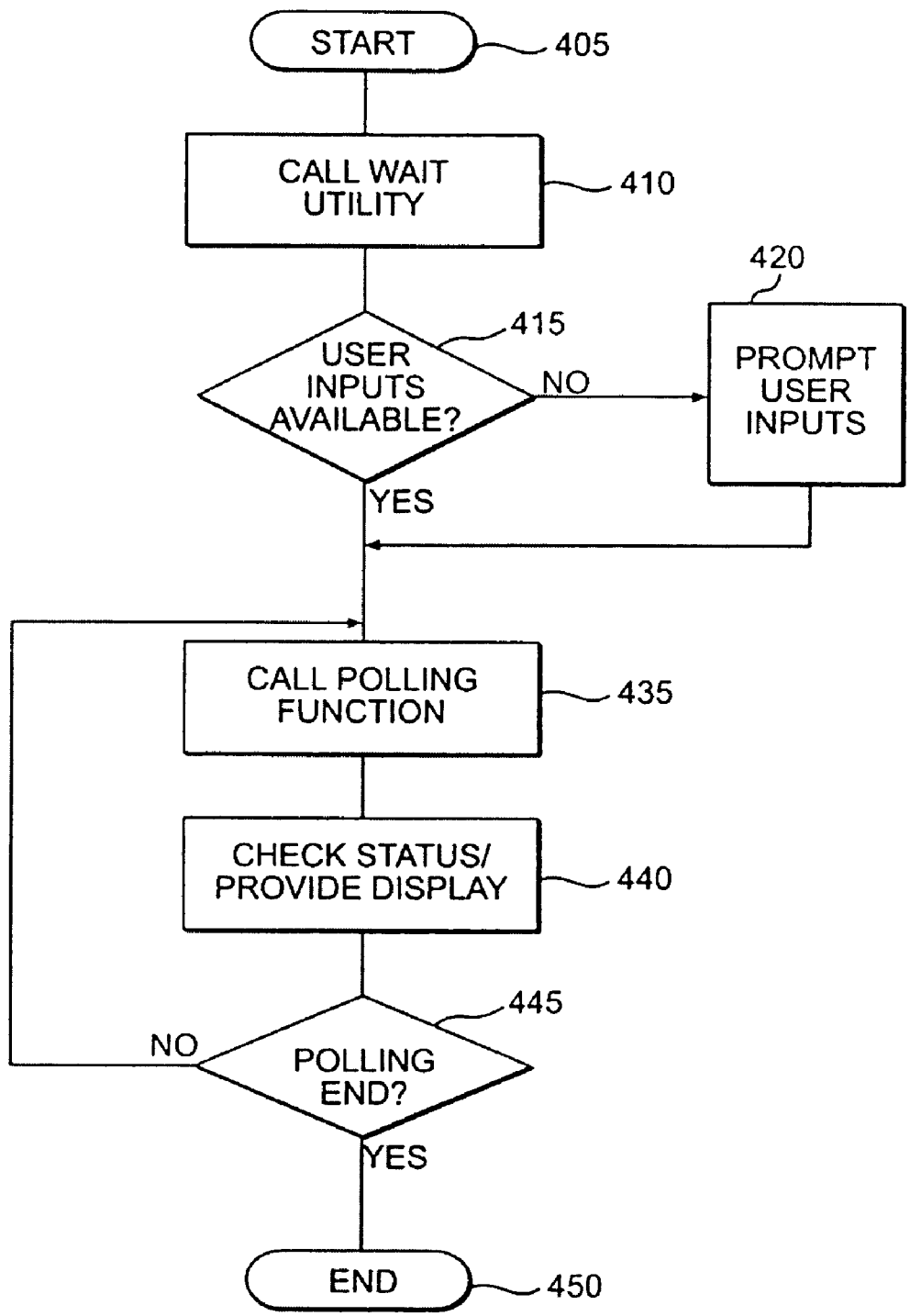
FIG. 4 is a flowchart showing a general operation of an application and an invoked wait utility.

FIG. 4 is a flowchart showing a general operation 400 of the application program invoking the wait utility 100. The operation 400 begins in block 405. In block 410, the application program, in executing a specific operation, calls the wait utility 100. In block 415, the wait utility 100 optionally determines if user inputs have been designated for the specific application operation. If the user inputs have not been designated, the operation 400 moves to block 420, and the wait utility 100 prompts the user to enter user-designated parameters. The operation 400 then moves to block 435, and the wait utility 100 calls the polling function. The operation then moves to block 440, and the wait utility 100 determines if the desired end state is achieved and provides a display, such as one of the displays shown in FIGS. 3A–3F. The operation 400 then moves to block 445, and the wait utility 100 determines if the wait has ended. If the wait has not ended, the operation 400 returns to block 435. Otherwise, the operation 400 ends, block 450.

Figure 5A:
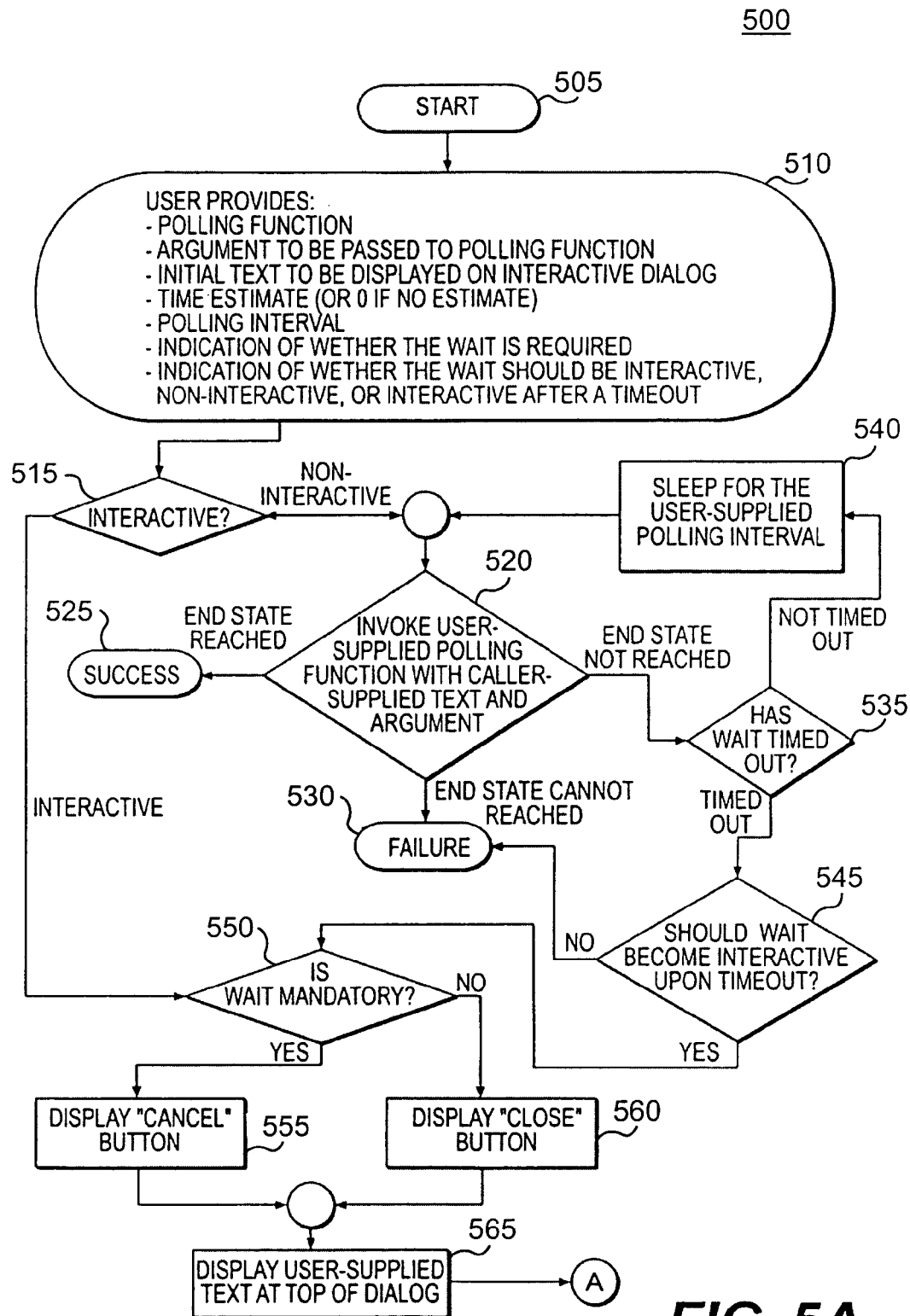
FIGS. 5A–5D illustrate an operation of the wait utility of FIG. 1A.

FIGS. 5A–5D show a flowchart illustrating a wait operation 500 as executed by the wait utility 100. The wait operation 500 may be applicable to a wide variety of application operations, including the application operations illustrated in FIGS. 3A–3G. As shown in FIG. 5A, the operation 500 starts with start block 505. In input block 510, the user interface module 110 is used to receive inputs from a user. The inputs may include one or more of a polling function, an argument to be based to the polling function, initial text to be displayed on an interactive dialog, a time estimate (or zero if no estimate), a polling interval, an indication of whether the wait is required, and an indication of whether the wait should be interactive, non-interactive, or interactive after a timeout. In block 515, the wait utility 100 determines if the application operation, or event, will include interactive wait operations. If interactive wait operations are not to be used, the operation 500 moves to block 520 and the user-supplied polling function with user-supplied text and argument are processed. If interactive wait operations are to be used, the operation 500 moves to block 550.

In block 520, the polling engine 120 in the wait utility 100 then determines if one of three possible states is reached: end state; end state cannot be reached; and end state not reached. If end state is reached, the operation 500 moves to block 525, success. If the end state is not reached, the operation 500 moves to block 535. In block 535, the timeout manager 170 determines if a time out has been reached. If a time out has not been reached, the operation moves to block 540, and the wait utility 100 enters a sleep state for the duration of the user-supplied polling interval. Once the polling interval has expired, the wait utility 100 wakes, and the operation 500 returns to block 520.

In block 535, if the time out manager 170 indicates the time out has been reached, the operation moves to block 545, and the operation 500 determines if the interactive feature should be asserted. In block 545, if the interactive feature is not to be asserted, the operation 500 moves to block 530, failure. If the interactive feature is to be asserted, the operation 500 moves to block 550 and the process control 190 determines if waiting is mandatory. If waiting is mandatory, the user interface module 110 provides a graphical display of a CANCEL button to the user, block 555. If waiting in not mandatory, the user interface module 110 provides a graphical display of a CLOSE button, block 560.

In block 565, the user interface module 110 then displays the user-supplied text at the top of a dialog box.

Figure 5B:
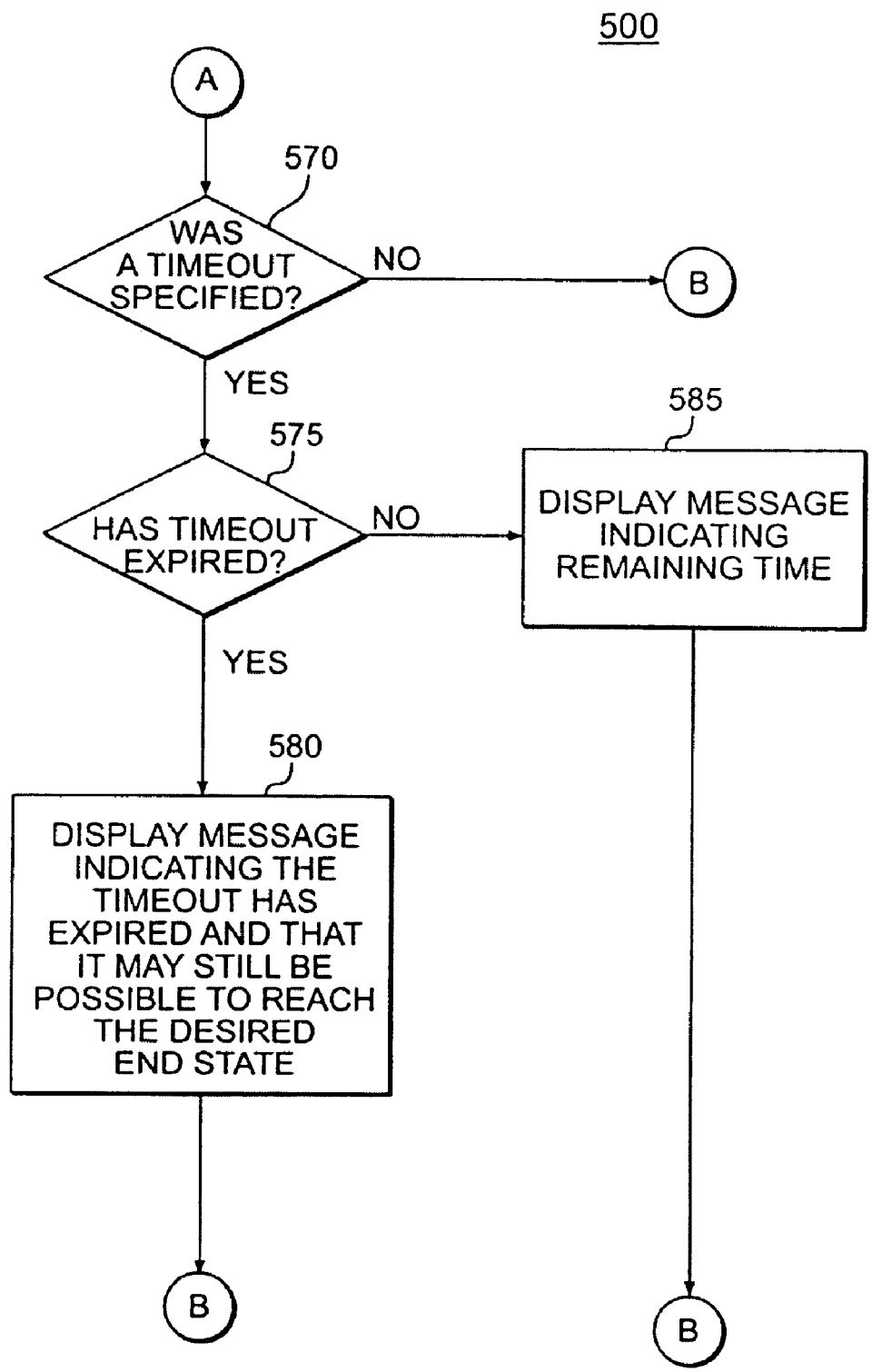

As shown in FIG. 5B, the operation 500 then moves to block 570 and the timeout manager 170 determines if a timeout was specified by the user. If a timeout was specified, the operation 500 moves to block 575. If a timeout was not specified, the operation 500 moves to block 590 (FIG. 5C).

In block 575, the timeout manager 170 determines if the specified timeout has expired. If the timeout has expired, the user interface module 110 displays a message indicating that the timeout has expired and that the desired end state may still be reached, block 580. If the timeout has not expired, the user interface module 110 displays a message indicating the time remaining, block 585. Following either block 580 or block 585, the operation 500 moves to block 590.

Figure 5C:
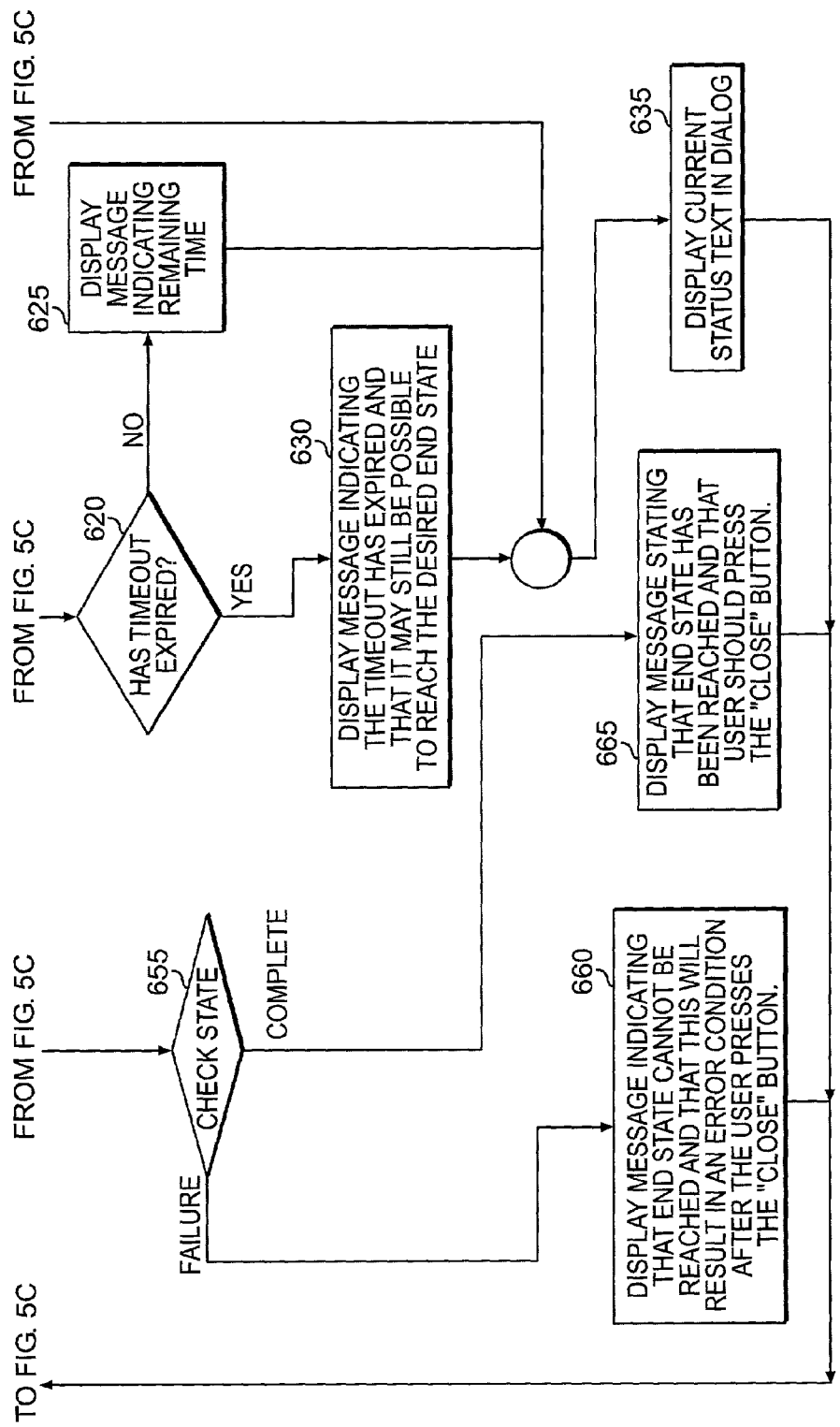
Figure 5D:
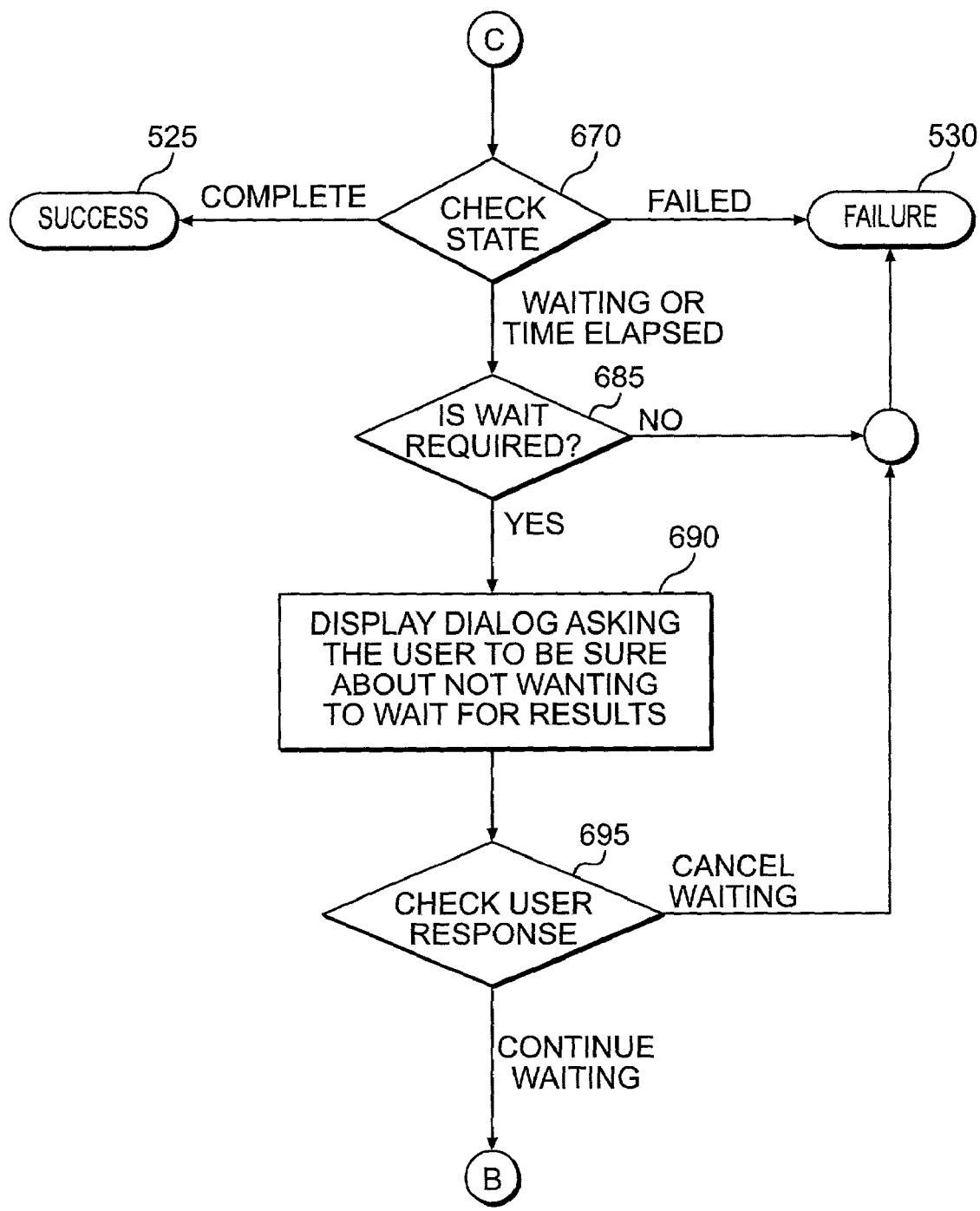

In FIG. 5C, the process control determines if the user "pushed" the CANCEL or CLOSE button. If the user pushed either the CANCEL or the CLOSE button, the operation 500 moves to block 670 (FIG. 5D). If neither button was pushed, the operation 500 moves to block 595, and the status checker 180 checks the state of the application operation being monitored. In block 595, if the state is COMPLETE or FAILED, the operation 500 returns to block 590. In block 595, if the state is STILL WAITING or TIME ELAPSED, the operation 500 moves to block 605, and the wait utility 100 waits for the user-supplied polling interval. At the expiration of the user-supplied polling interval, the polling engine 120 invokes the user-supplied polling function, block 610, and the polling engine 120 applies the user-supplied argument to the application operation to determine the state. In block 610, if the determined state is either STILL WAITING or TIME ELAPSED, the operation 500 moves to block 615, and the timeout manager 170 determines if a timeout was specified. If a timeout was specified, the timeout manager 170 determines if the timeout has expired, block 620. If the timeout has expired, the user interface module 110 displays a message indicating the timeout has expired and that the desired end state may still be reached, block 630. If the timeout has not expired, the user interface module 110 displays a message indicating the time remaining, block 625. Following either block 630 or block 625, the operation 500 moves to block 635. In block 635, the user interface module 110 displays the current status as text in a dialog box.

In block 610, if the state is determined to be either COMPLETE or FAILED, the operation 500 moves to block 640, and the user interface module 120 displays current status as text in a dialog box. The operation 500 then moves to block 645, and the user interface module 110 clears the time estimate text from the dialog box. In block 650, the user interface module 650 displays a CLOSE button. The operation 500 then moves to block 655, and the polling engine 120 checks the state of the application operation. If the state is FAILED, the user interface module 110 displays a message indicating that end state cannot be reached and that this will result in an error condition after the user pushes the CLOSE button, block 660. if the state is COMPLETE, the user interface module 110 displays a message stating that end state has been reached and that the user should push the CLOSE button, block 665. The operation 500 then returns to block 590.

In block 590, if the user interface module 110 determines that the user has pushed either the CANCEL or the CLOSE button, the operation 500 moves to block 670, and the polling engine 120 checks the state of the application operation. In FIG. 5D, block 670, the polling engine 120 determines if the state is one of COMPLETE, FAILED, STILL WAITING, or TIME ELAPSED. If the state is COMPLETE, the operation 500 moves to block 525, success. If the state is FAILED, the operation 500 moves to block 530, failure. If the state is STILL WAITING or TIME ELAPSED, the operation 500 moves to block 685, and the timeout manager 170 determines if waiting is required. If waiting is not required, the operation 500 moves to block 530, failure. If waiting is required, the operation 500 moves to block 690 and the user interface module 110 displays a dialog asking the user to indicate if the user does not want to wait for results. In block 695, the interactive module 140 checks the user response: cancel waiting, continue waiting or no response. If cancel waiting is received, the operation 500 moves to block 530, failure. If either continue waiting is received, or no response is received, the operation 500 returns to block 590.

The invention claimed is:

1. A computer-implemented method for controlling execution of an event, comprising:
   calling a wait utility to invoke a wait, wherein the wait utility provides for user-defined wait parameters;
   determining if the wait is one of interactive and non-interactive, wherein when the wait is interactive, the wait utility may present a human user with options to close or cancel the wait;
   if non-interactive:
   invoke the user-defined wait parameters, and
   determine an end state of the event based on the user-defined wait parameters;
   if interactive:
   determining if the wait is mandatory,
   determining if a timeout has expired, and
   invoking the user-defined wait parameters;
   wherein the user-defined wait parameters comprise one or more of a polling function, an argument to be passed to the polling function, initial text to be displayed in an interactive dialog, a time estimate for the wait, whether the wait is mandatory, and whether the wait is interactive, non-interactive, or interactive after the timeout; and
   wherein the step of invoking the user-defined wait parameters comprises applying an argument of the polling function to determine the event status.

2. The method of claim 1, wherein the wait is non-interactive, further comprising determining if a timeout has expired.

3. The method of claim 2, wherein the timeout has not expired, further comprising entering a sleep cycle corresponding to a user-defined wait parameter, wherein the user-defined wait parameter comprises a polling interval.

4. The method of claim 2, wherein the timeout has expired, further comprising determining if the wait should be made interactive, and wherein if the wait remains non-interactive, the end state of the event cannot be reached.

5. The method of claim 1, further comprising returning an event status to a user, wherein the event status includes one or more of time remaining for the event, timeout expired, end state reached for the event, and end state cannot be reached for the event.

6. The method of claim 1, further comprising receiving an instruction to terminate the wait.

7. A wait utility executable on a general purpose computer and used in conjunction with a computer-implemented application, wherein the wait utility is called by the application, the wait utility executing a wait operation, the wait utility comprising:
   a user interface module that receives user-defined wait parameters;
   a polling engine that applies one or more of the user-defined wait parameters to an event of the application;
   a text/graphics builder that provides an event status dialog for display to a user of the application;
   an interactive module that receives an instruction related to the wait operation from the user and provides a prompt to the user;
   a timeout manager that determines when a timeout condition related to the event is reached;
   wherein the user-defined wait parameters comprise one or more of a polling function, a polling interval, an argument to be passed to the polling function, initial text to be displayed in an interactive dialog, a time estimate for the wait, whether the wait is mandatory, and whether the wait is interactive, non-interactive, or interactive after the timeout; and
   wherein the polling engine applies the argument to the polling function to determine a status of the event.

8. The wait utility of claim 7, wherein the polling engine applies the argument to the polling function at the polling interval.

9. The wait utility of claim 7, wherein the interactive module prompts the use to close the wait when the event is one of complete and failed.

10. The wait utility of claim 7, wherein the interactive module prompts the user to cancel the wait when the event is pending.

11. A computer-implemented method for controlling an event by invoking a wait utility, comprising:
    receiving user-defined wait parameters to control execution of the wait utility;
    applying one or more of the user-defined wait parameters to determine a status of the event;
    providing a status dialog to a user;
    providing an interactive prompt to the user, wherein the user interacts with the wait utility;
    receiving a response based on the interactive prompt;
    determining a timeout of the event;
    wherein the user-defined wait parameters comprise one or more of a polling function, a polling interval, an argument to be passed to the polling function, initial text to be displayed in an interactive dialog, a time estimate for the wait, whether the wait is mandatory, and whether the wait is interactive, non-interactive, or interactive after the timeout; and
    wherein the step of applying the one or more user-defined wait parameters comprises applying the argument to the polling function to determine a status of the event.

12. The method of claim 11, comprising applying the polling function at the polling interval.

13. The method of claim 11, wherein the step of providing the interactive prompt comprises prompting the user to close the wait when the event is one of complete and failed.

14. The method of claim 11, wherein the step of providing the interactive prompt comprises prompting the user to cancel the wait when the event is pending.

15. A wait utility, executable on a general purpose computer, comprising:
    means for receiving user-defined wait parameters, wherein a user-defined wait parameter controls execution of a wait utility and wherein the user-defined wait parameters relate to a specific event of an application to be monitored;
    means for applying one or more of the user-defined wait parameters to determine a status of the event;

means for providing a status dialog to a user;
means for providing an interactive prompt to the user;
means for receiving a response based on the interactive prompt;
means for determining a timeout of the event;
wherein the user-defined wait parameters comprise one or more of a polling function, a polling interval, an argument to be passed to the polling function, initial text to be displayed in an interactive dialog, a time estimate for the wait, whether the wait is mandatory, and whether the wait is interactive, non-interactive, or interactive after the timeout; and
wherein means for applying the one or more user-defined wait parameters comprises means for applying the argument to the polling function to determine a status of the event.

16. The wait utility of claim 15, wherein the polling function is applied at the polling interval.

17. The wait utility of claim 15, wherein the means for providing the interactive prompt comprises means for prompting the user to close the wait when the event is one of complete and failed.

18. The wait utility of claim 15, wherein the means for of providing the interactive prompt comprises means for prompting the user to cancel the wait when the event is pending.

* * * * *

UNITED STATES PATENT AND TRADEMARK OFFICE
CERTIFICATE OF CORRECTION

PATENT NO. : 7,047,533 B2  Page 1 of 1
APPLICATION NO. : 09/948780
DATED : May 16, 2006
INVENTOR(S) : Edgar Circenis It is certified that error appears in the above-identified patent and that said Letters Patent is hereby corrected as shown below:

IN THE ABSTRACT

Title Page, in the abstract, line 12, delete "purposes" and insert therefor --purpose--

IN THE CLAIMS

Claim 18, Column 12, line 9, after "means for" delete "of"

Signed and Sealed this

Sixteenth Day of October, 2007

JON W. DUDAS
*Director of the United States Patent and Trademark Office*